No. 896,598.  
PATENTED AUG. 18, 1908.  
A. W. SWENDER.  
CALF WEANER.  
APPLICATION FILED JULY 23, 1907.

WITNESSES:

Albert W. Swender,
INVENTOR,

By C. A. Snow & Co.
ATTORNEYS

UNITED STATES PATENT OFFICE.

ALBERT W. SWENDER, OF CARROLL, IOWA.

CALF-WEANER.

No. 896,598.  Specification of Letters Patent.  Patented Aug. 18, 1908.

Application filed July 23, 1907. Serial No. 385,131.

*To all whom it may concern:*

Be it known that I, ALBERT W. SWENDER, a citizen of the United States, residing at Carroll, in the county of Carroll and State of Iowa, have invented a new and useful Calf-Weaner, of which the following is a specification.

My present invention relates to improvements in weaners for calves and other live stock, and it has for its object to provide an improved device of this character that is capable of being manufactured cheaply, and which, in practice, operates automatically to prevent the calf from sucking, although, when its head is lowered, the weaner will engage the ground or other support and permit grazing or feeding of the animal.

Another object of the invention is to provide such a device with a nose and chin band that is so located relatively to the basket or guard of the weaner that the lifting of the latter cannot injure the animal's nose, and also to provide a simple and efficient device for supporting the guard in proper position before the animal's mouth.

A further object of the invention is to provide a simple and efficient connection for permitting a pivotal movement of the basket relatively to the halter.

To these and other ends, the invention comprises the various novel features of construction and combination of parts, which will be hereinafter more fully described, and pointed out particularly in the appended claims.

Figure 1:
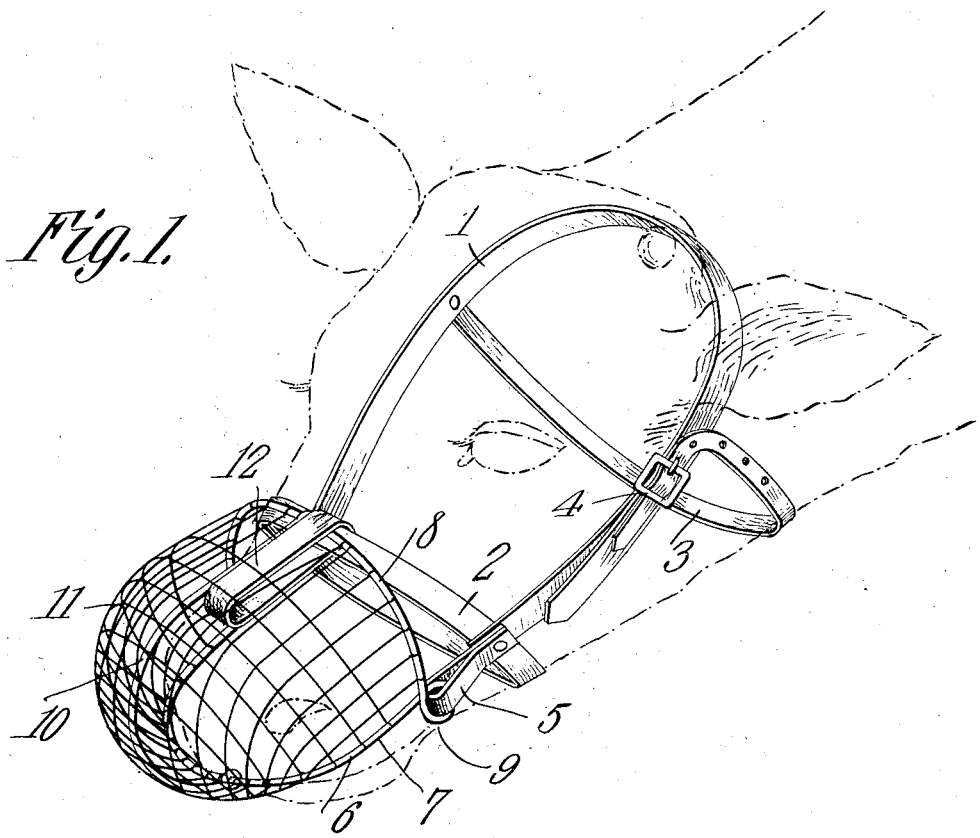
Figure 2:
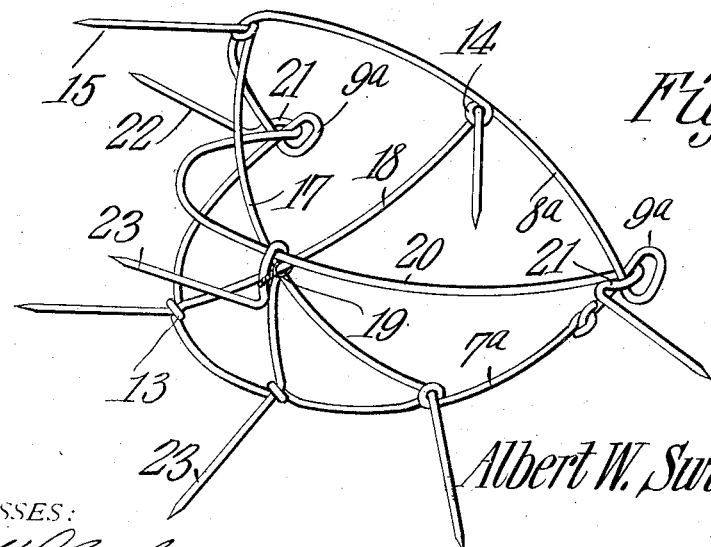

In the accompanying drawings, Figure 1 is a perspective view of the calf weaner constructed in accordance with the present invention, the guard being shown in a position that will permit grazing or feeding of the animal. Fig. 2 is a perspective view of a different form of guard adapted to be used in connection with a halter similar to that shown in Fig. 1.

Corresponding parts in the several figures are indicated throughout by similar characters of reference.

The weaners shown in the present forms of the invention comprise, generally, a halter which is suitably secured to the head of the animal, and a guard or other openwork structure, which is pivotally attached to the halter and is arranged to cover and uncover the animal's mouth, so that when the animal's head is in an elevated position, the weight of the guard will serve to retain it in a position to cover the mouth, although a lowering of the animal's head permits the guard to easily swing clear of the animal's mouth and thereby permit grazing or feeding.

In that form of the invention shown in Fig. 1, the halter is composed of a main head strap 1 which is in the form of a loop and extends over the head of the animal at the rear of the ears, and the free ends of the strap are connected at diametrically opposite points to a flat band 2 which immediately encircles the chin and nose. A throat strap 3 is also shown in the present instance which is in the form of a loop, one end being permanently attached to one side of the head strap 1 and its opposite end is adjustably attached to the opposite side of the head strap by means of a buckle 4 which permits the halter to be easily adjusted to the animal's head. Projecting forwardly from the band 2, and preferably in line with the head strap, are a pair of guard attaching loops 5 which are preferably composed of leather straps doubled and riveted to the band at the points where the ends of the main strap joins it.

The guard shown in Fig. 1 is composed of a frame 6 which is made preferably from a length of wire having its ends hooked together or otherwise joined, and it is bent to form a pair of semi-circular bows 7 and 8 which lie in intersecting planes substantially at right angles to one another, the wire formed between and connecting the bows forming rings 9 through which the straps composing the loops 5 pass. In order to retain the bows of the frame in proper angular relation, it is preferable to provide a stay 10 which is bow-shaped to clear the nostrils of the animal and is rigidly attached at its opposite ends to the respective bows of the frame. The latter is covered by a suitable open wire form.

The band 2, which extends over the animal's nose, is so located relatively to the upper bow 8 of the basket that when the latter tilts upwardly about the loops 5 and the coöperating rings 9 as an axis, it will engage the frame of the guard and thereby limit its movement, the band receiving the thrust and preventing injury to the animal's nose, and the pivotal movement of the guard in the opposite direction is limited by a loop 12 which is preferably composed of a strap of endless form which encircles the outer bow 8 of the guard and the band 2, the loop permitting the guard to extend upwardly to clear the animal's mouth, and limiting its downward movement to a position that would cover the mouth of the animal.

Instead of employing a guard wherein the frame is covered by an open wire, it may be preferable in some cases to employ a guard such as that shown in Fig. 2, the frame in that case being composed of a pair of bows 7$^a$ and 8$^a$ arranged in angular relation and forming a pair of rings 9$^a$ at the points where the bows intersect, and these bows are provided with sets of eyes 13 and 14 through which the spikes 15 and 16 on a pair of diagonally arranged wires 17 and 18, respectively, pass, the diagonally arranged wires being preferably bound, as at 19. The supplemental bow 20 is preferably arranged intermediate the bows first mentioned, it being secured by extending its opposite ends through the rings 9$^a$ and thence doubling the wire to form the bends 21, the ends of the wire being finally extended to form a pair of spikes 22.

If so desired, an additional pair of spikes 23 may be provided by looping a wire about the supplemental bow and the diagonal wires at the point where they intersect and extending the lower end of the wire through an eye formed centrally in the lower bow.

A device of this character constructed in accordance with the present invention may be manufactured cheaply, and, in practice, it operates effectually for the purposes intended, the halter being so constructed that it cannot become accidentally displaced, though it is capable of being adjusted to fit animals of different sizes, and the guard operates automatically by reason of the pivotal connection of the halter.

I claim as my invention:—

1. A device of the character described embodying a guard adapted to cover the animal's mouth, of a halter for securing the guard in position and having a flat relatively wide band encircling the nose and chin of the animal, and a pair of loops secured at opposite sides of the band and pivotally connected to the guard, said band being disposed in the path of movement of the guard and adapted to engage the adjacent end of the latter for limiting the upward movement of the guard.

2. A device of the character described embodying a guard adapted to cover the animal's mouth, and a halter for the animal's head, said halter being pivotally connected to the guard to permit the latter to swing into positions to cover and uncover the animal's mouth and provided with a flat band encircling the animal's nose and chin and adapted to engage the adjacent end of the guard for limiting the upward tilting movement thereof.

3. A device of the character described embodying a guard adapted to cover the animal's mouth, and a halter for the animal's head, said halter being pivotally connected to the guard to permit the latter to swing into positions to cover and uncover the animal's mouth and provided with a flat band encircling the animal's nose and chin and adapted to engage the adjacent end of the guard for limiting the upward tilting movement of the latter, and a loop encircling the band and loosely engaging the adjacent end of the guard for limiting the downward movement of said guard.

4. In a device of the character described, a halter adapted to engage the animal's head and having a pair of loops formed thereon, a guard having a wire frame provided with a pair of rings having their axes in alinement and pivotally connected with the loops on the halter to permit a relative pivotal movement of the guard, and a flat band forming a part of the halter and encircling the animal's nose and chin, said band being disposed in the path of movement of the frame and adapted to engage the latter for limiting the upward movement of said guard.

5. In a device of the character described a halter adapted to engage the animal's head, a guard having a frame composed of wire bent to form a pair of bows, a pair of axially alined loops being formed in the frame at points adjacent the intersection of the bows, devices pivotally connected with the loops for fastening the guard to the halter, and a flat band encircling the nose and chin of the animal and forming a part of the halter, said band being disposed in the path of movement of the frame and adapted to bear against the adjacent bow of the guard for limiting the upward tilting movement thereof.

In testimony that I claim the foregoing as my own, I have hereto affixed my signature in the presence of two witnesses.

ALBERT W. SWENDER.

Witnesses:
J. J. MEYERS,
MYRTLE MITTS.